May 16, 1967     H. L. COOPERMAN     3,319,528
PRECISE POSITIONING DEVICE
Filed Oct. 4, 1965     2 Sheets-Sheet 2
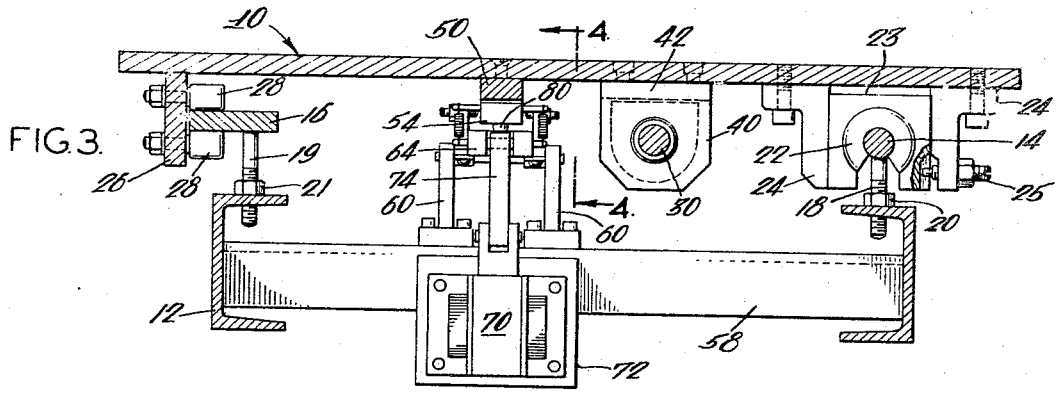
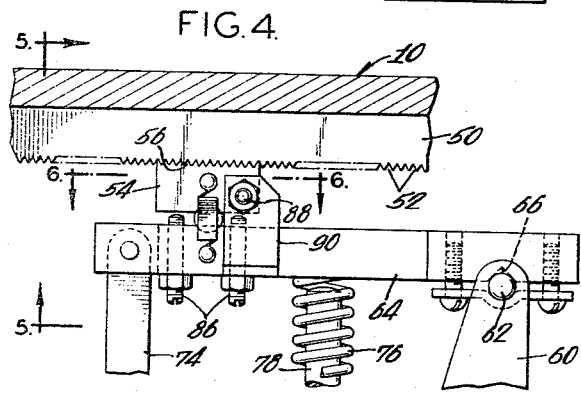
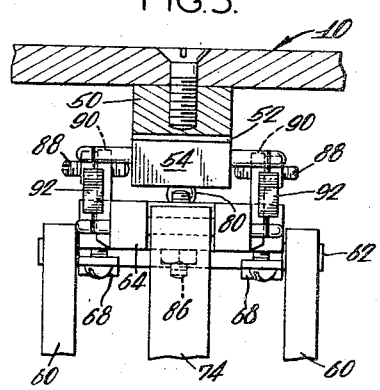
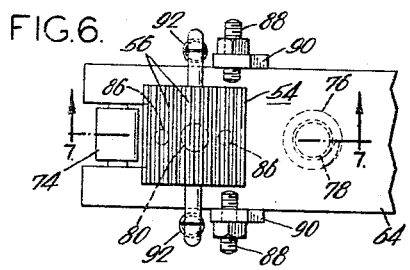
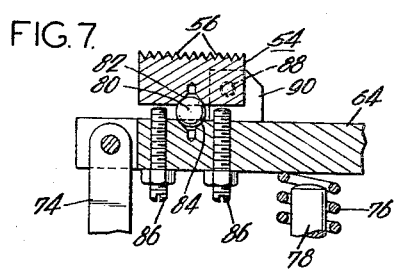
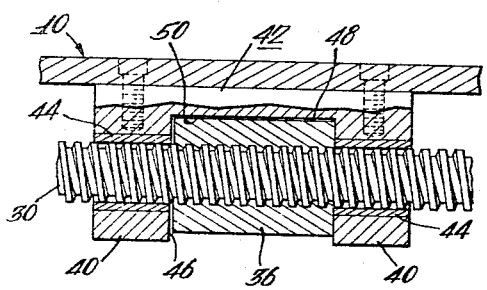
Inventor:
Harris Lee Cooperman
by Howson & Howson
Attys.

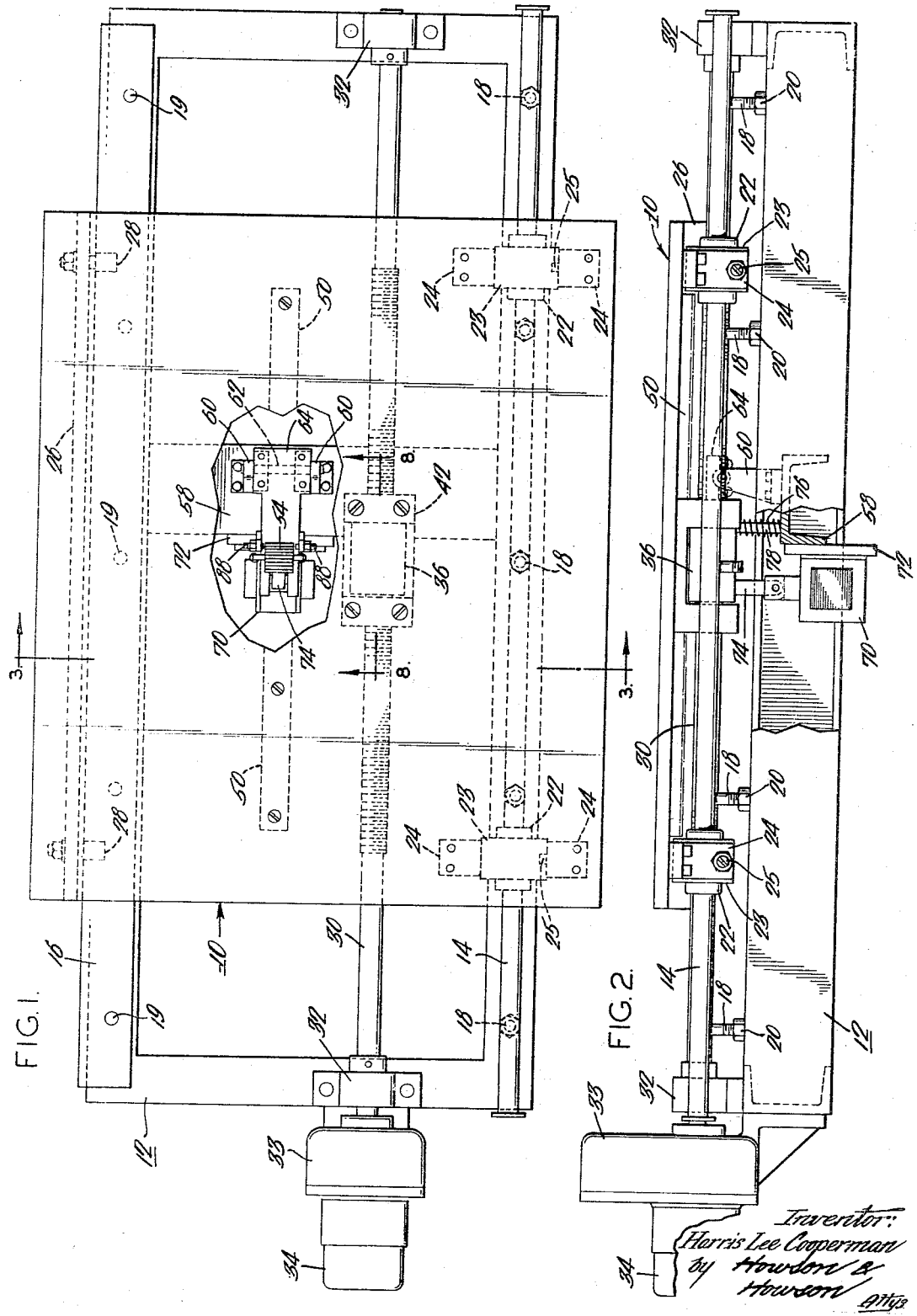

United States Patent Office 3,319,528
Patented May 16, 1967

3,319,528
PRECISE POSITIONING DEVICE
Harris Lee Cooperman, 215 W. Willow Grove Ave.,
Philadelphia, Pa. 19118
Filed Oct. 4, 1965, Ser. No. 492,759
9 Claims. (Cl. 90—58)

The present invention relates generally to apparatus for accurately controlling the successive positions of a movable element such as the work table of a machine. The invention relates more particularly to a precise positioning device which is especially adapted for "step and repeat" operations wherein it is necessary to effect a precise movement of an object between repeated operations applied thereto.

Although a wide variety of applications of the present invention can be envisioned, the obvious uses include automatic machine tools wherein a machine work table may be electrically programmed and tape controlled to provide predetermined machining operations at accurately spaced points on the work secured to the table. For example, the boring of a precisely spaced sequence of holes could be automatically controlled by a system employing the present device.

A further application of the invention is in the field of micro-electronics and involves the production of microcircuits by means of photographic exposures. A large number of circuits is conventionally "printed" on a single sheet by a multiplicity of adjoining exposures, the sheet then being divided to separate the tiny individual circuits. In view of the extremely small size of the circuits, the successive positioning of the circuit exposures must be accurate, and the present apparatus has been found to be ideally suited to provide the necessary precision in a rapid, efficient manner.

It is accordingly a first object of the present invention to provide a positioning device for controlling with extreme accuracy the position of a movable element such as the work table of a machine, camera or other apparatus.

Another object of the invention is to provide a positioning device as described which provides a positive mechanical locking of the movable element.

A further object of the invention is to provide a positioning device as described which is readily adaptable to automatic control.

Additional objects and advantages of the invention will become apparent from the following detailed description of an embodiment thereof when taken together with the following drawings in which:

FIG. 1 is a plan view showing a movable work table controlled by a precise positioning device in accordance with the present invention;

FIG. 2 is a side elevational view of the apparatus shown in FIG. 1;

FIG. 3 is a sectional view taken along line 3—3 of FIG. 1;

FIG. 4 is an enlarged view taken along line 4—4 of FIG. 3 showing the details of the interengaged toothed positioning elements;

FIG. 5 is a view taken along line 5—5 of FIG. 4;

FIG. 6 is a view taken along line 6—6 of FIG. 4;

FIG. 7 is a sectional view taken along line 7—7 of FIG. 6; and

FIG. 8 is a sectional view taken along line 8—8 of FIG. 1 showing details of the coarse positioning means.

Referring to the drawings and particularly FIGS. 1–3 thereof, the present invention is shown as a controlling means for positioning a table 10 which is slidably mounted for horizontal translation with respect to a rectangular frame 12. The frame 12 is fabricated of welded channel members and includes slidable support means for the table 10 which comprises a guide rail 14 and a guide bar 16 respectively mounted above the opposed side channel members of the frame 12. The guide rail and guide bar as shown most distinctly in FIG. 3, are respectively secured in a raised disposition above the frame 12 by posts 18 and 19 threadedly engaged with the flanges of the frame and locked thereto by nuts 20 and 21.

Spaced rectilinear bearings 22 in bearing holders 23 support one side of the table 10, being secured therebeneath for sliding engagement with the guide rail 14 by the brackets 24 and bolts 25. A roller support element 26, depending beneath the table at the opposite side from the bearings 22, supports a pair of opposed rollers 28 adjacent each end of the table, the rollers being suitably spaced to receive the guide bar 16 therebetween. This arrangement provides a slidably mounted table which, due to the combination of the rectilinear and roller support bearings, permits expansion and contraction of the table while at the same time providing a transversely rigid table. The guide rail, guide bar and rollers 28 are precision finished and polished so that movement of the table is nearly frictionless.

The precise positioning of the table 10 on the frame 12 is effected in two stages, the table being first brought into the approximately correct position by a coarse positioning means comprising the threaded shaft 30 journaled in the pillow blocks 32 on the frame and driven through speed reducer 33 by motor 34 at one end thereof. Upon rotation, the threaded shaft drives the table 10 by means of the nut 36 which is captive between the arms 40 of the yoke 42 bolted to the underside of the table. The arms 40 of the yoke are bored and provided with bearings 44 to permit a sliding passage along the shaft 30. An axial clearance 46 between the nut 36 and arms 40 and a radial clearance 48 between the nut and the underside 50 of the central portion of the yoke are essential for reasons which will shortly become apparent.

The second stage in the positioning of the table 10 is effected by a fine positioning means which comprises selectively engageable toothed members including a toothed bar 50 bolted to the underside of the table 10 parallel with the guide rail 14 and guide bar 16 and having a downwardly directed array of teeth 52, which teeth are perpendicular to the line of movement of the table. Juxtaposed beneath the toothed bar 50 is a toothed shoe 54 having an upwardly directed array of teeth 56 of the same pitch and type as the teeth 52. The toothed shoe 54 is selectively movable vertically with respect to the frame by an arrangement which insures an accurate alignment of the shoe 54 with the bar 50 and also a parallel disposition of the shoe with respect to the bar. This arrangement is supported on a cross tie 58 extending between the side channel members of the frame 12 as shown most distinctly in FIG. 3 and includes a pair of spaced support arms 60 bolted to the top of the cross tie. Between the upper ends of the support arms 60 is journaled a horizontal shaft 62. A rocker arm 64 is pivotally mounted at one end thereof on the shaft 62 by means of the slot 66 and the bolted retaining strips 68. Downward pivotal movement of the arm 64 is controlled by a solenoid 70 secured to a support plate 72 on the cross ties 58. The solenoid is connected to the movable end of the arm 64 by the connecting arm 74. When the solenoid is not energized, the arm 64 is moved upwardly by the compression spring 76 positioned between the arm 64 and the cross tie 58 by the spring guide rod 78.

The toothed shoe 54, as shown most clearly in FIG. 7, is seated on a ball bearing 80 on the arm 64, the shoe and the arm having respective conical recesses 82 and 84 to receive the ball bearing. This arrangement prevents linear movement of the shoe with respect to the arm and frame while permitting a free floating alignment of the toothed shoe with the toothed bar upon interengagement of the respective teeth thereof. Under rotational movement of the shoe on the ball bearing 80 is prevented in a vertical plane by the adjustable stop bolts 86 in the arm 64. Similarly, horizontal rotation of the shoe on the ball bearing is limited by the stop bolts 88 in the upstanding ears 90 mounted on each side of the arm 64 as shown in FIGS. 5 and 6. To prevent the shoe from becoming unseated from the ball, springs 92 attached to opposite sides of the arm 64 and aligned transversely with the ball bearing 80 are attached to arms 94 projecting horizontally from the shoe. The springs also serve to return the shoe to an intermediate position between the stop bolts 86 and 88 upon disengagement of the shoe from the bar.

For operation, with the solenoid energized to disengage the toothed members, the table is first moved by the coarse positioning means, the motor driven screw 30, to the approximate position desired, which position must be accurate to within one-half of the pitch of the toothed members. The approximate position may be readily established by utilizing a counter to record the number of shaft revolutions. Knowing the number of threads per inch, the number of shaft revolutions required to produce a given movement can be easily determined.

Upon establishing the approximate table position by use of the coarse positioning means, the fine positioning means is activated by deenergizing the solenoid 70 and permitting the spring 76 acting on the arm 64 to raise the toothed shoe 54 upwardly against the toothed bar 50 of the table. In view of the nearly frictionless mounting of the table and the clearance 46 provided between the nut 36 and yoke 38, the camming movement of the interengaging teeth moves the table into a precise position with respect to the frame 12.

The use of flat toothed members each having a plurality of complementary teeth as a fine positioning means provides a very high degree of precision. Even though perfection in the machining of the individual tooth services cannot be achieved, it is a statistical necessity that upon engagement of the toothed shoe with the toothed bar, there is only one resultant position of the table relative to the frame. Repeat settings of a very high precision, for example within two ten thousandths of an inch, can accordingly be obtained.

The tooth type of the toothed members should preferably be the flat sided tooth configuration illustrated to achieve a surface contact of the engaged teeth. Gear teeth and other line-contact types of teeth will not provide the desired repeat accuracy.

Although it will be apparent that the movements of the table must be multiples of the tooth pitch of the fine positioning means, the toothed bar and shoe members may be readily changed should the tooth pitch prevent the movements desired in a specific application.

As an example of threaded shaft and tooth pitch dimensions which have proved suitable in a device of the type illustrated, a tooth pitch of .050 inch has been employed in conjunction with a threaded shaft coarse positioning means having five threads per inch.

Other types of coarse positioning means other than the threaded shaft illustrated could be employed and the invention should not be considered to be limited to such a specific arrangement. It is, however, necessary that the coarse positioning means be characterized by end-play or clearance sufficient to permit the necessary table movement by the fine positioning toothed members.

Although the illustrated device provides a positioning of the table in a single direction, two such devices can be combined in superposed relation to provide table positioning in two perpendicular or otherwise oriented directions.

The present device is ideally suited for automatic control. By utilizing a servo motor control and other suitable circuitry the device can be made fully automatic.

Manifestly, changes in details of construction can be effected by those skilled in the art without departing from the spirit and the scope of the invention as defined in and limited solely by the appended claims.

I claim:
1. A precise positioning device comprising a frame, an element movably mounted on said frame for selective translational positioning with respect thereto, a coarse positioning means for establishing an approximate position of said element, and a fine positioning means for establishing an exact position of said element, said fine positioning means comprising interengageable toothed members mounted in juxtaposed relation on said frame and said element, a first one of said toothed members being fixedly mounted on said frame or said element, means restricting linear movement of the second one of said toothed members to a plane perpendicular to the line of movement of said element and means for selectively engaging said toothed members to establish a precise position of said element with respect to said frame.

2. The invention as claimed in claim 1 wherein said toothed members include a plurality of flat-walled teeth adapted for complementary interengagement.

3. A precise positioning device comprising a frame, a table mounted on said frame, bearing means permitting a sliding low-friction translation of said table with respect to said frame, a coarse positioning means for establishing an approximate position of said table, and a fine positioning means for establishing an exact position of said table, said fine positioning means comprising interengageable toothed members mounted in juxtaposed relation on said frame and said table, a first one of said toothed members being fixedly mounted on said frame or said table, means restricting linear movement of the second one of said toothed members to a plane perpendicular to the line of movement of said table and means for selectively engaging said toothed members to establish a precise position of said table with respect to said frame, said coarse positioning means having sufficient play or clearance to permit the necessary movement of said table by said fine positioning means.

4. The invention as claimed in claim 3 wherein said toothed members include a plurality of flat-walled teeth adapted for complementary interengagement.

5. A precise positioning device comprising a frame, a table mounted on said frame, bearing means permitting a sliding low-friction translation of said table with respect to said frame, a coarse positioning means for establishing an approximate position of said table, and a fine positioning means for establishing an exact position of said table, said fine positioning means comprising a toothed bar on said table aligned in the direction of translation of said table, a toothed shoe mounted on said frame in juxtaposed relation to said toothed bar, said toothed bar and toothed shoe including a plurality of flat-walled teeth adapted for complementary interengagement, means restricting linear movement of said toothed shoe to a plane perpendicular to the translation of said table, and means for selectively engaging said toothed shoe with said toothed bar to establish a precise position of said table with respect to said frame, said rough positioning means having sufficient play or clearance to permit the necessary movement of said table by said fine positioning means.

6. The invention as claimed in claim 5, said toothed shoe being seated on ball bearing means on said frame, said ball bearing means permitting alignment of said shoe teeth with said bar teeth while preventing translational movement of said shoe.

7. The invention as claimed in claim 5 wherein said coarse positioning means comprises a threaded shaft mounted for rotation on said frame aligned with the direction of translation of said table, a yoke on said table associated with said shaft, a nut on said shaft captive within said yoke, and means for rotating said shaft to effect movement of said table.

8. The invention as claimed in claim 5, said shoe being mounted on an arm on said frame, means pivotally mounting said arm to said frame to permit movement of said shoe substantially perpendicular to said bar upon interengagement of said shoe and bar teeth.

9. The invention as claimed in claim 4 including means permitting rotational movement of said second one of said toothed members to permit alignment of the flat walled teeth thereof with the teeth of the first one of said toothed members.

References Cited by the Examiner

UNITED STATES PATENTS

| 1,387,598 | 8/1921 | Folberth | 77—34.7 |
| 2,134,743 | 11/1938 | Strawn | 90—16 |
| 2,880,632 | 4/1959 | Charlat | 90—58 |

WILLIAM W. DYER, JR., *Primary Examiner.*

G. A. DOST, *Assistant Examiner.*